United States Patent
Trang et al.

(10) Patent No.: US 11,552,900 B2
(45) Date of Patent: Jan. 10, 2023

(54) MANAGEMENT FOR MANAGING RESOURCE ALLOCATION IN AN EDGE COMPUTING SYSTEM

(71) Applicant: SONY GROUP CORPORATION, Tokyo (JP)

(72) Inventors: Linh Trang, Åkarp (SE); Svante Alnås, Lund (SE)

(73) Assignee: Sony Group Corporation, Tokyo (JP)

( * ) Notice: Subject to any disclaimer, the term of this patent is extended or adjusted under 35 U.S.C. 154(b) by 36 days.

(21) Appl. No.: 17/417,366

(22) PCT Filed: Jan. 28, 2020

(86) PCT No.: PCT/SE2020/050067
§ 371 (c)(1),
(2) Date: Jun. 22, 2021

(87) PCT Pub. No.: WO2020/190189
PCT Pub. Date: Sep. 24, 2020

(65) Prior Publication Data
US 2022/0078133 A1 Mar. 10, 2022

(30) Foreign Application Priority Data
Mar. 18, 2019 (SE) .................................. 1950332-5

(51) Int. Cl.
*H04L 47/78* (2022.01)
*H04L 47/762* (2022.01)
(Continued)

(52) U.S. Cl.
CPC .......... *H04L 47/781* (2013.01); *H04L 47/762* (2013.01); *H04L 47/803* (2013.01); *H04L 67/63* (2022.05)

(58) Field of Classification Search
None
See application file for complete search history.

(56) References Cited

U.S. PATENT DOCUMENTS 10,771,337 B1 * 9/2020 Das .................. H04L 63/102
2015/0134953 A1 * 5/2015 Seaborn ............ H04L 63/0428
713/168

(Continued)

FOREIGN PATENT DOCUMENTS

WO  2017194619 A1  11/2017

OTHER PUBLICATIONS

International Search Report and Written Opinion from corresponding International Application No. PCT/SE2020/050067, dated May 6, 2020, 11 pages.

(Continued)

*Primary Examiner* — Jeffrey R Swearingen
(74) *Attorney, Agent, or Firm* — Tucker Ellis LLP

(57) ABSTRACT

A method for managing resource allocation in an Edge Computing, EC, system (30), carried out in an EC management entity (300) connected to at least one EC host (220). The method comprises detecting (501) a request from a user equipment, UE, (303), which request is associated with an EC application; providing (502) at least one application instance of said EC application in a host of the EC system; receiving (503) user assignment information from the EC application; and determining (504) a mapping between the UE and a specific application instance based on the received user assignment information.

14 Claims, 4 Drawing Sheets

(51) Int. Cl.
*H04L 47/80* (2022.01)
*H04L 67/63* (2022.01)

(56) References Cited

U.S. PATENT DOCUMENTS

2018/0263039 A1 9/2018 Fang
2019/0080081 A1* 3/2019 Goodridge .............. G06F 9/445

OTHER PUBLICATIONS

Zte et al., "MEC-0021—Application relocation initiation for Clause 5", ETSI, MEC(18)000066r2, Aug. 9, 2018, 4 pages.
ETSI, "Multi-access Edge Computing (MEC); MEC Application Mobility", Draft ETSI GS MEC 0021 V2.0.7, Dec. 2018, 28 pages.
Office Action and Search Report from corresponding Swedish Application No. 1950332-5, dated Oct. 28, 2019, 7 pages.

* cited by examiner

MANAGEMENT FOR MANAGING RESOURCE ALLOCATION IN AN EDGE COMPUTING SYSTEM

TECHNICAL FIELD

The invention and its embodiments are related to the field of systems for providing Edge Computing (EC) resources in connection with communication networks, whereby computing power is made available to user equipment operating in communication with the communication network. More specifically, the invention relates to devices and methods for managing resource allocation in an edge computing system.

BACKGROUND

The development of cloud-based services, operating to assist mobile devices with network-assisted storage and computing, is heavily increasing. Currently, ETSI (European Telecommunication Standards Institute) is promoting a new technology originally denoted Mobile Edge Computing (MEC), which is being standardized in an ETSI Industry Specification Group (ISG) of the same name. In the second phase of ETSI MEC ISG this is replaced by the term Multi-access Edge Computing, using the same acronym MEC, which also includes other types of access besides cellular, e.g. wifi and fixed networks.

MEC is a network architecture concept that enables cloud computing capabilities and an IT service environment at the edge of a communication network. MEC is the term used by ETSI for the concept mobile Edge Computing (EC). MEC allows applications to benefit from ultra-low latency and high bandwidth as well as real-time access to radio network information.

The MEC architecture fundamentals are based on a central management entity being responsible for resources, scaling and selecting the server for hosting the application instance. However, the MEC application is totally independent of the management entity's decisions and is only responsible for the logic of how to manage and distribute users among EC application instances. This means that the EC application has all logic on which users belong to the same group, for example in a video conference system but the management entity decides how scaling of EC servers and assigning of users should be done regardless of the EC application. This may cause thus problems associated with management of resource allocation, e.g. when scaling is contemplated in the system.

SUMMARY

Solutions related to the problems associated with managing resource allocation in an EC system are set out in the claims.

In accordance with a first aspect, a method is provided for managing resource allocation in an Edge Computing, EC, system, carried out in an EC management entity connected to at least one EC host, comprising
  detecting a request from a user equipment, UE, which request is associated with an EC application;
  providing at least one application instance of said EC application in a host of the EC system;
  receiving user assignment information from the EC application; and
  determining a mapping between the UE and a specific application instance based on the received user assignment information.

By means of this method, the EC management entity may maintain an up to date register of correct mapping of how application users of different UEs are assigned to various application instances, which may be used for taking well-based decisions related to scaling of the system and handling of UE mobility.

In one embodiment, said user assignment information identifies the specific application instance assigned to said UE.

In one embodiment, providing at least one application instance includes selecting a mapping between the UE and a first application instance, to assign a user of the UE to the first application instance. This way, an original mapping may be determined by the management entity, which may be updated if the application itself subsequently re-assigns the UE to another application instance.

In one embodiment, providing at least one application instance includes directing the UE to the first application instance. This may e.g. involve sending an URI or other address location information to the UE.

In one embodiment, said user assignment information identifies a redistribution of application user identities between two or more different application instances within the EC system, determined by the application. This way, the method allows for management of relocation of a plurality of UEs and provides for the possibility for the management entity to update its mapping for several UEs in a common operation rather than one at a time.

In one embodiment, determining a mapping includes updating the selected mapping for the UE to the said specific application, responsive to the specific application instance being different from the first application instance. This implies that the application may either acknowledge the assignment made by the management entity, or send an updated assignment, which allows for the management entity to ensure that correct mapping information is maintained.

In one embodiment, providing at least one application instance includes selecting a currently operative application instance. This may be advantageous for the management entity to relocate UEs in the context of scaling of resources.

In one embodiment, providing at least one application instance includes starting a new application instance. This may be used when a new UE attaches to the system and starts an application.

In one embodiment, the method may comprise storing the mapping in a memory storage.

In one embodiment, detecting a request from the UE includes detecting initiation of the application from the UE. This may involve the UE starting a UE application, for which there is a corresponding system application.

In one embodiment, detecting a request from the UE includes detecting connection to the EC system of the UE, when the UE is running the EC application.

In one embodiment, the method comprises determining to scale resources in the EC system responsive to detecting the request from the UE.

In one embodiment, the method comprises determining allocation of resources to the specific application instance based on the mapping.

In one embodiment, the method comprises
  providing said at least one application instance with information about other application instances of the same application. This way, the application is maintained aware of the various instances between which re-location of UEs may be carried out.

BRIEF DESCRIPTION OF THE DRAWINGS

Various embodiments will be outlined below with reference to the drawings, on which

DESCRIPTION OF EMBODIMENTS

Figure 1:
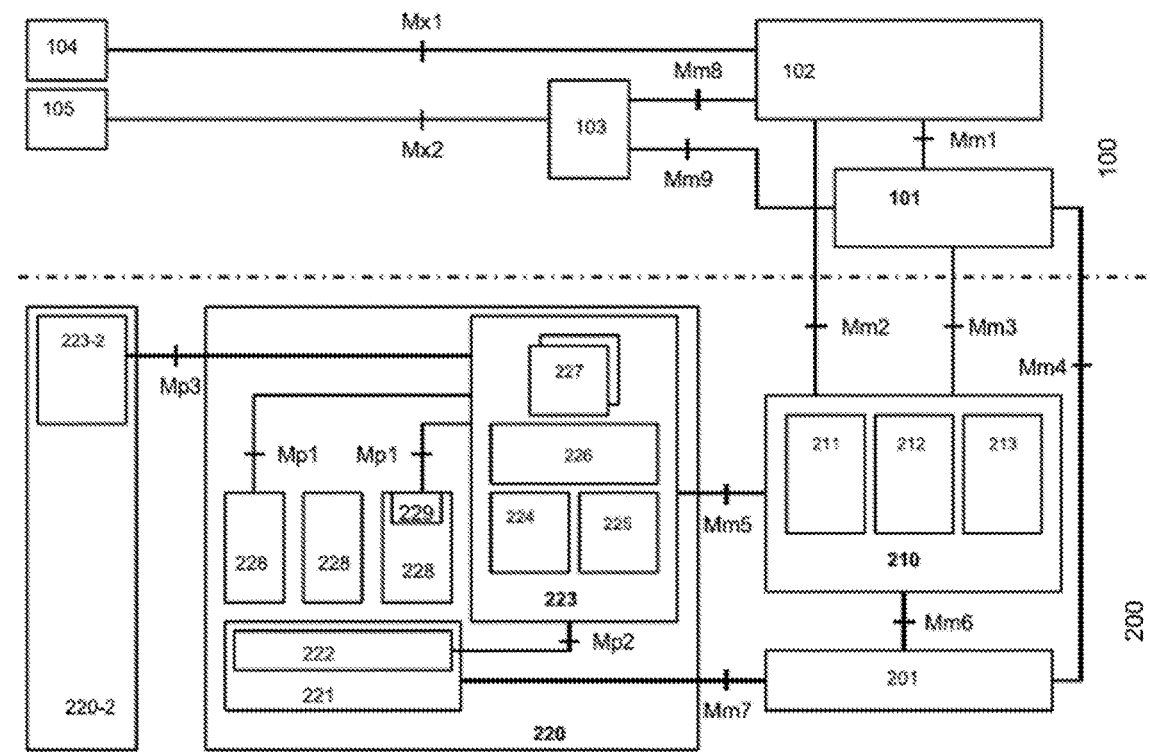
FIG. 1 illustrates an EC system according to one embodiment.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Edge Computing (EC) is thought of as a natural development in the evolution of mobile radio stations and the convergence of IT and telecommunication networking. EC is based on a virtualized platform and will enable applications and services to be hosted 'on top' of mobile network elements, i.e. above the network layer. These applications and services can benefit from being in close proximity to the customer and from receiving local radio-network contextual information. The environment of EC is characterized by low latency, proximity, high bandwidth, and real-time insight into radio network information and location awareness, accomplished with EC servers hosting operator or 3rd party applications. As such, EC may enable new vertical business segments and services for consumers and enterprise customers. Frequently discussed use cases include video analytics, location services, Internet-of-Things (IoT), augmented reality, optimized local content distribution, data caching, mobile gaming, connected and controlled vehicle services etc. EC will allow software applications to tap into local content and real-time information about local-access network conditions. By deploying various services and caching content at the network edge, mobile core networks are alleviated of further congestion and can efficiently serve local purposes.

MEC is the term used by ETSI, but other forms of Edge Computing architectures are plausible, such as proprietary systems. For these reasons, the more general term Edge Computing (EC) will predominantly be employed herein, while the term MEC will occasionally be used to illustrate such examples.

FIG. 1 illustrates an EC system reference architecture, in the form of a MEC network architecture configured according to an embodiment, showing functional elements that comprise the EC system, and the reference points between them.

In a broad context, an EC system comprises one or more EC hosts or servers, which hosts may run or execute EC applications to users, connecting to the EC system through a User Equipment (UE), typically by radio communication. Moreover, the EC system comprises an EC management entity, which is configured to control the EC hosts to instantiate EC applications using one or more services.

For an ETSI MEC system with MEC components, as shown in FIG. 1, there are three groups of reference points defined between the system entities:

reference points regarding MEC platform functionality (Mp);

management reference points (Mm); and reference points connecting to external entities (Mx).

In accordance with some embodiments, an MEC system may be divided into an MEC system level 100 and an MEC host level 200. The system may comprise one or more MEC servers or hosts 220, 220-2 etc., and MEC management necessary to run MEC applications within an operator network or a subset of an operator network.

The MEC server 220 may be an entity that contains an MEC platform 223 and a virtualization infrastructure 221 which provides compute, storage, and network resources, for the purpose of running MEC applications 228.

The MEC server 220, 220-2, or more generally an EC server or EC host 220, may comprise an MEC platform 223, which is a collection of essential functionality required to run MEC applications 228 on a particular virtualization infrastructure and enable them to provide and consume MEC services. The MEC platform 223 may also provide services. Such services may e.g. include radio network information services, configured to provide authorized EC applications with radio network related information; location services, configured to provide authorized EC applications with location-related information; bandwidth manager services, configured to allow allocation of bandwidth to certain traffic routed to and from EC applications and the prioritization of certain traffic.

MEC applications 228 are instantiated on the virtualization infrastructure of the MEC server 220 based on configuration or requests validated by MEC management. The MEC management may comprise MEC system level management and MEC host level management. Further MEC servers 220-2 may form additional EC servers of the system, which may be configured in a corresponding manner as the MEC server 220.

The MEC system level management includes an MEC orchestrator 101 as a core component, which is configured to have an overview of the complete MEC system, and an operations support system 102. The MEC host level management comprises an MEC platform manager 210 and a virtualization infrastructure manager 201 and is configured to handle management of MEC specific functionality of a particular MEC server 220, and the applications 228 running on it.

In an embodiment configured in accordance with the ETSI MEC standard, the system may comprise the following elements or features:
- 100 Mobile edge system level
- 101 Mobile edge orchestrator
- 102 Operations Support System
- 103 User app LCM proxy
- 104 CFS portal
- 105 UE app
- 200 Mobile edge host level
- 201 Virtualization infrastructure manager
- 210 Mobile edge platform manager
- 211 MEC platform element mgmt
- 212 MEC app rules & reqts mgmt
- 213 MEC app lifecycle mgmt
- 220 Mobile edge server
- 221 Virtualization infrastructure
- 222 Data plane
- 223 Mobile edge platform
- 224 Traffic rules control
- 225 DNS handling
- 226 Service registry
- 227 MEC service
- 228 MEC app
- 229 Service
- 220-2 Other MEC server
- 223-2 Other MEC platform In the context of the solutions provided herein, an embodiment set out for MEC may include an EC management entity 300 which includes at least the MECorchestrator 101, but the EC management entity may also include the Operations Support System 102, and optionally also the platform manager 210.

Figure 2:
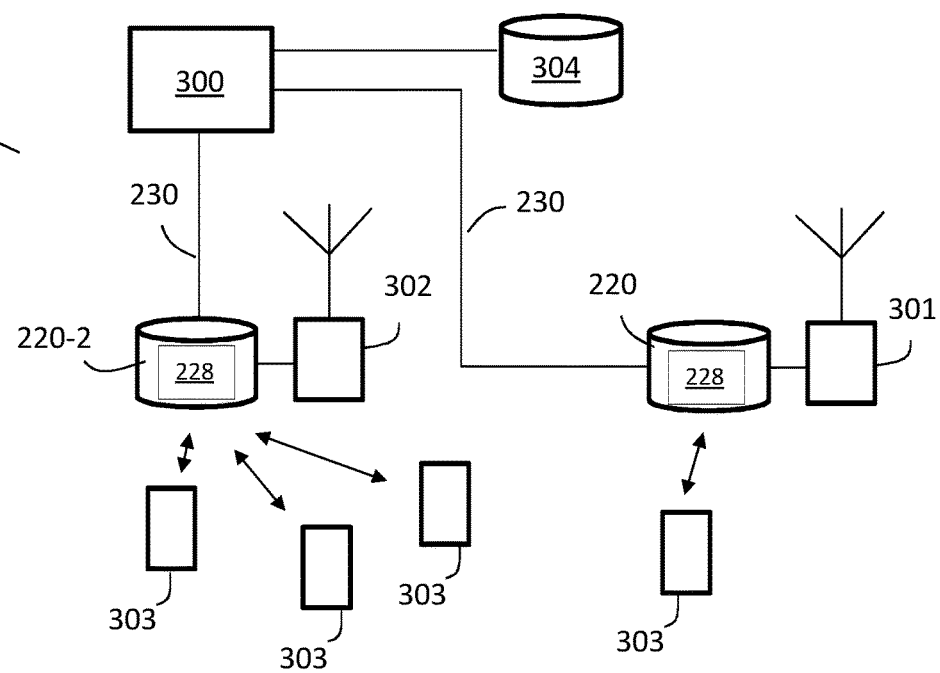
FIG. 2 illustrates a scenario of mobile devices supported by an EC system according to an embodiment.

FIG. 2 schematically illustrates various User Equipment (UE) 303 operating as wireless devices 303 in a wireless communication network comprising network nodes 301, 302. The wireless communication network may comprise a radio access network, and the network nodes 301, 302 may be radio stations in a cellular arrangement. Such a radio communication network may e.g. be a 3GPP LTE network, in which the network nodes 301, 302 are denoted eNodeB. Furthermore, in a 3GPP NR network, the network node 301, 302 are denoted gNodeB. In an alternative embodiment, the radio communication network may e.g. be a wifi system, such as according to IEEE 802.11. The network nodes 301, 302 may in such a system be denoted access points and are typically not arranged in a cellular arrangement. In various embodiments, various EC servers may be configured to be connectable to UEs using other communication technologies, such as e.g. Bluetooth, LoRa, ZigBee etc. It may also be noted that different EC servers, or hosts, 220, 220-2 may be connected to different types of access network nodes 301, 302, while still belonging to a common EC system 30.

A first server 220 configured to operate as an EC server or host is connected to a first radio station 301, and a second server 220-2 configured to operate as an EC server or host is connected to a second radio station 302. An EC management entity 300 may be configured to control relocation of an application session from the first EC server 220 to the second EC server 220-2. As noted, and with reference to FIG. 1, the EC management entity 300 may e.g. comprise an MEC orchestrator 101 and an operations support system 102, and optionally also an MEC platform manager 210 in various embodiments. An interface 230 is schematically indicated between an EC application 228 and the EC management entity 300. This interface may be employed for providing context, e.g. user context, obtained in the EC server 220, to the management entity 300, which is inter alia configured to control relocation of an application session from the first EC server 220 to a second EC server 220-2.

Various methods for operating an EC system 30 will now be discussed, wherein one or more UEs are served by the EC system 30 to carry out application tasks. In this context, reference is frequently made to a UE 303. It may be noted that in various embodiments, such as in an implementation of the EC system 30 as a MEC system 30, the entity being served is rather referred to as a user, or user ID, of the UE 303. A UE may e.g. be identified by means of an IMSI number or network address number, whereas the user or user ID may be identified by means of a user name and/or password. For the sake of simplicity, no further distinction between user, user ID and UE are made herein, unless where required.

In the EC system 30, the management entity 300 of the system, e.g. Orchestrator and/or Platform Manager, may be configured to create a mapping between the UE 303 (or a user or user ID of the UE), and the application instance which is selected and assigned by the management entity 300 to host the UE 303. An application instance is a specific execution environment for the application 228. After the initial application instance selection and assignment by the management entity 300, the application 228 may decide where/how to distribute its users in a proprietary way. The application 228 may thereby decide to re-locate the user to another application instance than the one selected by the EC system, after which the original mapping, based on the assignment selected by the management entity 300, may not reflect the correct application instance.

In another aspect, scaling in an EC system 30 is about changing the allocation of the resources (among available resources) in terms of memory, CPU, storage etc. to the EC system 30. Scalability is important in edge/cloud computing and allows the EC system 30 to accommodate larger loads, i.e. handle a growing amount of processing tasks, just by adding resource (scale up) or reduce resources when the load decreases (scale down). The EC management entity 300 is responsible for handling scaling in the EC system 30. The information that the management entity 300 can use to decide how to map users to different application instances can be based on available resources, location of the resources, where the application instances are running and where the user is located. Furthermore, scaling is currently only managed by the management entity 300 without involving the EC applications 288 in MEC solutions. Resources are allocated to certain EC application instances by the management entity 300 and when the load increases for a certain EC application instance, e.g. the number of users increases and reaches a maximum limit, the EC system 30 accommodates this by creating additional EC application instances and new users are routed to the new additional EC application instances. However, this may not always be optimal from the EC application's point of view. For example, new users may belong to the same application 228 session as some of the users on the initial application instance, e.g. on the same video conference call, or playing a video game with or against each other. It would be optimal if all users that belonged to a common group or application session are hosted on the same application instance so that synchronization between application instances is not needed. In such a circumstance, the EC application 228 may be configured to group and redistribute its users. Also, in this case, the original mapping between the user or UE 303 determined by the EC management entity 300 and the application instance may no longer be valid or true in the EC system 30 after such an action from the EC application 228.

Yet another scenario is user, or UE 303, mobility. When a user is moving away from the current EC application instance hosting the user, such as a server 220 and closer to another EC application instance, such as running in another server 220-2, the EC system 30 may decide to relocate the user to another EC application instance closer to the user. This decision may conflict with a preference or requirement of the EC application 228, and in various embodiments it is the responsibility of the EC application 228 to distribute its users. Also, in this case the EC application 228 may override the decision of the EC system and the mapping between the user and the application instance, held in the EC system, is thus not representative of the true application instance assignment for the user or UE 303 after such an action from the EC application 228.

A problem associated with all three scenarios, in which the EC management entity 300 of the EC system 30 is not aware of how the users are distributed and mapped to the different EC application instances, is that the system 30 cannot pro-active scale the EC application instances where the expected load/users will be due to mobility. This implies that the EC system cannot take the user's mobility into consideration for scaling.

To target these problems, it is hereby suggested to arrange for transparency between user assignment to EC application instances between the EC management entity 300 and the EC application 228 itself. In preferred embodiments, communication between the management entity 300 and the application 228 is carried out via an EC platform manager 210, which may include or be connected to an EC platform 223 in an EC host or server on which application instance is provided.

Figure 5:
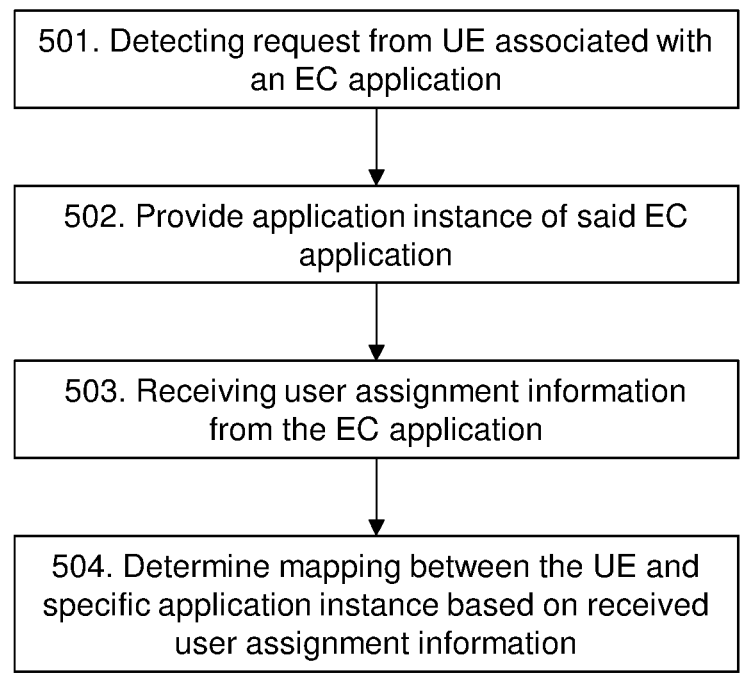
FIG. 5 schematically illustrates a flow chart for a method for managing resource allocation in an edge computing system according to an embodiment.

A flow chart for a general embodiment of the suggested embodiment is shown in FIG. 5. This relates to a method for managing resource allocation in an EC system 30, which comprises an EC management entity 300 and one or more communicatively connected EC hosts 220, 220-2, in which hosts an EC application 228 may be instantiated by the management entity 300 for providing an EC task for a user of a UE 303. The method is described as carried out in the EC management entity 300, which may comprise a MEC orchestrator, and may comprise the following steps:

In one step, the management entity 300 may detect 501 a request from the UE 303, which request is associated with an EC application 228. This request may be associated with a request to provide an application instance for a UE 303 already connected to the EC system 30. Alternatively, the UE 303 may be a new device to the system 30, and may even already be using the EC application 228 in question, but in a different EC system. In another alternative, the UE may be mobile and moving within the EC system, and may indicate a certain level or quality of connection to a current application instance, e.g. over a radio network, which may be interpreted as a request in the management entity 300.

In one step, the management entity 300 may provide 502 at least one application instance of said EC application 228 in a host of the EC system. In various embodiments, this step may include selecting a mapping between the UE and a first application instance, so as to assign a user of the UE to the first application instance. This way, a connection between the UE 303 or the corresponding user and a selected first application instance is determined, and may be stored in data storage 304 in or connected to the management entity 300. The management entity 300 may further be configured to direct the UE to the selected first application instance, such as by providing a URI for that first application instance to the UE 303. In various embodiment, providing at least one application instance may include selecting a currently operative application instance. In other embodiments, providing at least one application instance may include starting a new application instance.

In one step, the management entity 300 may receive 503 user assignment information from the EC application 228. In some embodiments, the user assignment information identifies a specific application instance assigned to said UE. If the application 228 does not perform, or request to perform, any relocation of the assignment of the UE 303 to another assignment than the first assignment, this step may simply be a confirmation, or may be dispensed with. However, if the application 228 takes the decision to disregard, override or subsequently change the assignment provided by the management entity 300, this step provides information to from the application 228 to the management entity 300 of which specific application instance the application 228 itself has assigned to the UE 303. In various embodiments, the user assignment information may identify a redistribution of user identities between two or more different application instances within the EC system, determined by the application 228. The user assignment information may thus provide information of assignment of several UEs or users between different application instances.

In one step, the management entity 300 may determine a mapping between the UE and the specific application instance based on the received user assignment information. In various embodiments, the mapping may first be determined responsive to receiving user assignment information from the EC application 228, whether that be a confirmation of the assignment selected by the management entity 300, or a different assignment of application instance. This provides for a handshake procedure, guaranteeing that proper assignment information is provided in the stored mapping, on which the management entity 300 may base distribution of UEs and resources in scenarios of e.g. required scaling or UE mobility. Moreover, in this embodiment, or in alternative embodiments, determining a mapping may include updating a previously selected mapping for the UE to the said specific application 228, responsive to the specific application instance being different from the first application instance. This will also configure the management entity 300 to hold proper assignment information in the stored mapping.

In various embodiments, the management entity 300 may thus be configured to determine to scale resources in the EC system responsive to detecting the request from the UE, or responsive to receiving user assignment information from the EC application 228, indicating a different mapping than selected by the management entity 300. The management entity 300 may further be configured to determine allocation of resources to various application instances, such as said specific application instance, based on the obtained proper mapping.

In the proposed embodiments, it is thus suggested to include the EC application 228 in the assignment of EC application instances for users, such as new users, so as to contribute to scaling procedures (scale up and scale down) and mobility procedures controlled through the management entity 300 in an EC system 30. This may include a step of informing the EC application 228 about scaling changes to be able to optimize user distribution among EC application instances and update the management entity 300 of the user distribution. This allows the EC management entity 300 to track the individual users and estimate proactively how to scale depending on expected user mobility.

Figure 3:
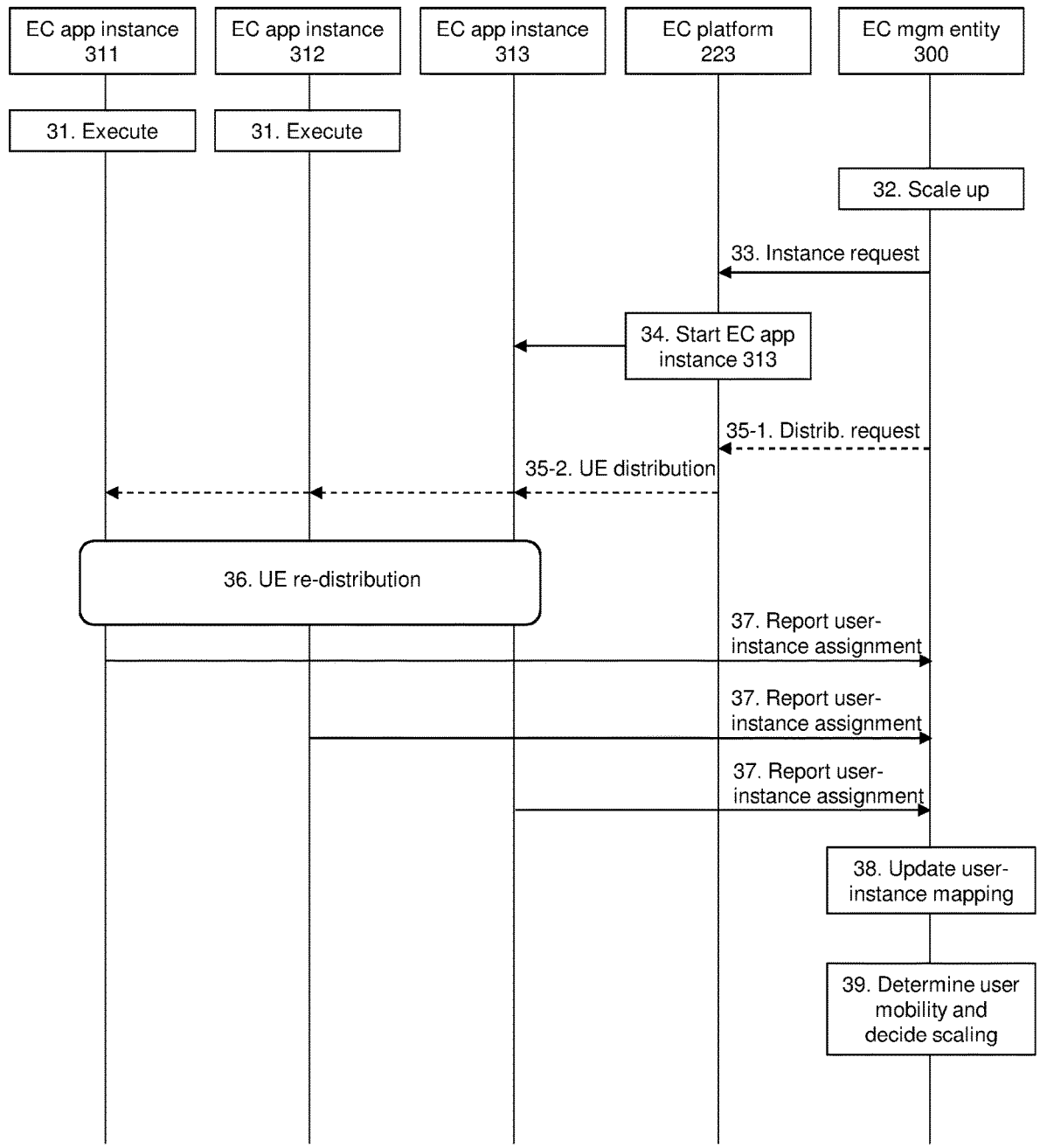
FIG. 3 schematically illustrates a signaling diagram of an embodiment wherein scaling of an EC system is carried out by activating a new application instance.

FIG. 3 schematically illustrates a signaling diagram of an embodiment, falling within the scope of at least the most general embodiment outlined above, wherein scaling of an EC system 30 is carried out by activating a new application instance. In this exemplary embodiment, three application instances 311, 312, 313 of a common EC application 228 are indicated, but further or fewer instances are equally plausible. An EC platform 223 is further shown, in addition to the EC management entity 300. In various embodiments, an EC platform manager 210 and the EC management entity 300 may be different parts of a common entity. In other embodiments, the EC platform manager 210 may form part of or be connected to one or more EC platforms 223 in one or more EC hosts 220. The various application instances 311, 312, 313 may further be provided on different EC hosts 220, 220-2 etc., or two or more of the application instances 311, 312, 313 may be provided on the same EC host 220.

In the shown scenario, the first 311 and second 312 application instance are already present, executing 31 the application 228 for one or more users or UEs 303. A decision to scale up 32 is taken by the management entity 300. This may e.g. be triggered based on evaluation of total resource utilization in the system 30, causing the decision 32 to scale up/down, including to distribute the users to or between various application instances. As an example, one or more of the present application instances 311, 312 may have a large number of users, putting a strain on available resources for that instance. In the shown example, the decision 32 to scale up results in the management entity 300 requesting 33 to the EC platform 223 to provide an application instance to the new user.

The EC platform 223 thus starts 34 a new, third, application instance 313 on an EC host 220.

Based on e.g. total available resources, the management entity 300 may further provide a distribution request 35-1, which as such may form part of the instance request 33, to the EC platform 223. This distribution request may e.g. define a re-distribution of users already presently using the application instances 311, 312, among the updated number of application instances 311, 312, 313. This may e.g. be based on a change in available resources, or simply to make better use of the different application instances 311, 312, 313. This re-distribution 35-2 is carried out under control of the EC platform 223.

In a step 36, the EC application 228 may execute a user or UE re-distribution, of its own volition. This new distribution of application users among the updated application instances 311, 312, 313 may e.g. be influenced by the creation of the new application instance 313, a by recent mobility of the users. Furthermore, the re-distribution 36 may be carried out based on two or more application users having associated context, such as engaging in a common application session, as already exemplified.

In a step 37, corresponding to step 503 of FIG. 5, the EC application 228 informs the management entity 300, possibly through the platform manager 210, of the new user assignment corresponding to the new distribution of users between EC application instances 311, 312, 313.

In a step 38, the management entity 300 creates or updates a mapping between users or UEs and application instances 311, 312, 313. This step may include storing the mapping in memory storage 304.

In a step 39, the management entity 300 may track and estimate user mobility and decides new scaling based thereon, now having access to reliable mapping information between users and application instances.

Figure 4:
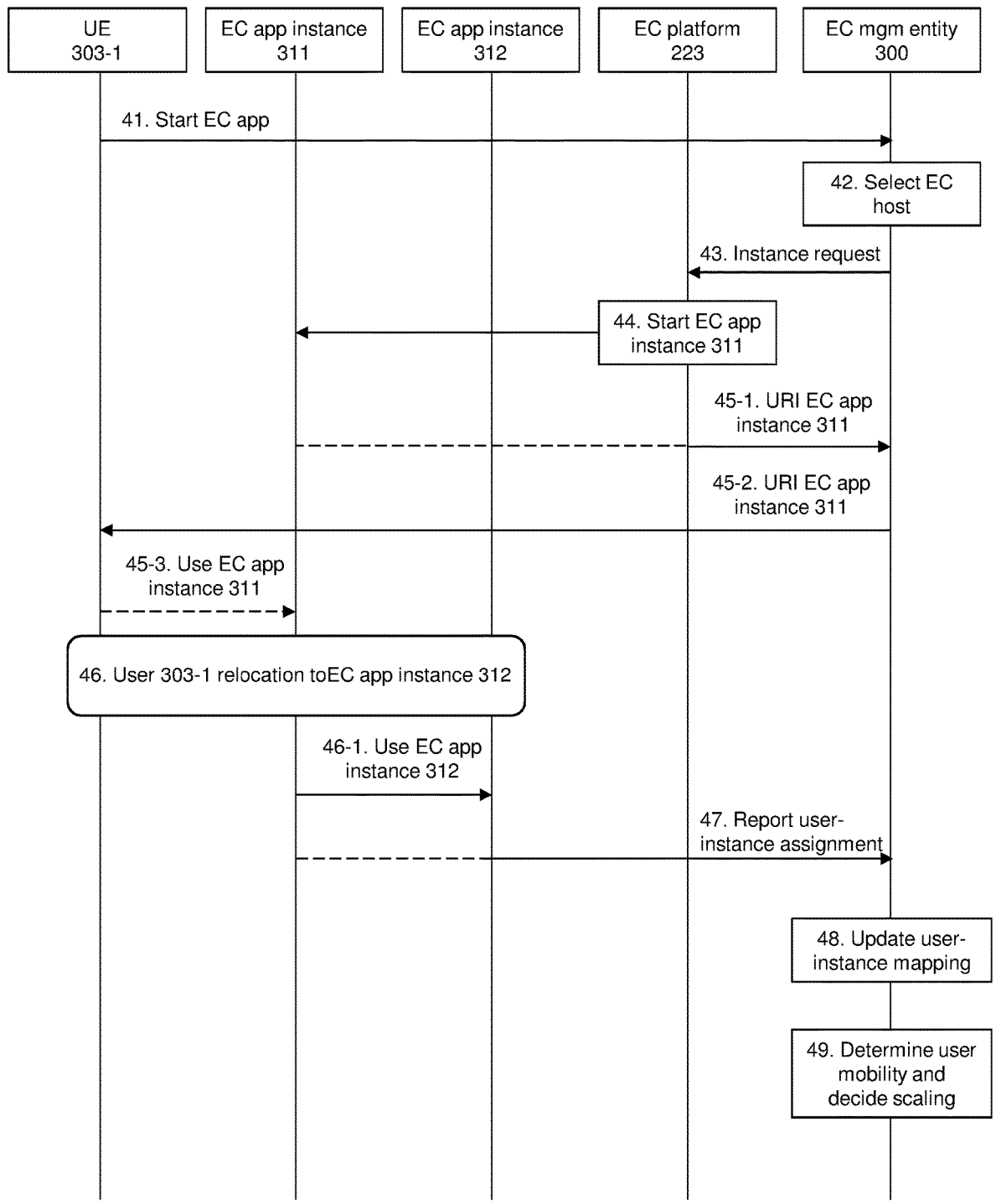
FIG. 4 schematically illustrates a signaling diagram of an embodiment wherein a new user triggers instantiation of an application.

FIG. 4 schematically illustrates a signaling diagram of an embodiment wherein a new user, represented in the drawing by its UE 303-1, triggers instantiation of an application 228, falling within the scope of at least the most general embodiment outlined above. In this exemplary embodiment, two application instances 311, 312 of a common EC application 228 are indicated, but further or fewer instances are equally plausible. An EC platform manager 210 is further shown, in addition to the EC management entity 300. In various embodiments, the EC platform manager 210 and the EC management entity 300 may be different parts of a common entity. In other embodiments, the Alternatively, the EC platform manager 210 may form part of or be connected to one or more EC platforms 223 in one or more EC hosts 220. The various application instances 311, 312 may further be provided on different EC hosts 220, 220-2 etc., or two or more of the application instances 311, 312 may be provided on the same EC host 220.

In a step 41, the UE 303-1 starts an EC application 228, including transmitting a signal to the management entity 300 of the EC system 30 to indicate a request for EC resources.

In step 42 the management entity 300 may select an EC host 220 to be assigned to the UE 303-1, dependent on various data, such as location of the UE 303-1 and of the hosts 220, 220-2 of the EC system, the type of application 228, available resources etc.

In step 43, the management entity 300 provides an instantiation request to the EC platform 223 to start an application instance.

In step 44, the EC platform 223 controls the instantiation of application instance 311 on a host 220.

In step 45-1, a URI for the application instance 311 is obtained in the management entity 300, from the EC platform 223.

In step 45-2, the management entity 300 informs the UE 303-1 of the URI of the application instance 311.

At this point, the UE 303-1 may make use of the EC resources for running the application 228, by connection to the host 220 having the application instance 311. This is indicated in the drawing by step 45-3.

At a certain instance, indicated by step 46, the UE 303-1 may be relocated to a different application instance, under control by the application 228. This relocation may be triggered as soon as the application 228 has enough data to determine that a present application instance 312 is more suitable to use for assisting the UE 303-1. Such data may e.g. be a user ID of the UE 303-1 and a session ID of the application 228, which may be mapped to other users running the same application 228 in a common session, such as the same game or a common video conference. Hence, the relocation 46 may take place before the user of the UE 303-1 even starts making use of the application instance 311.

In step 46-1, the relocation has been executed and the UE 303-1 now uses the second application instance 312, assigned by the application 228.

In step 47, the management entity 300 is informed of the relocation, by providing the updated assignment to application instance 312. The report may be transmitted from either the original application instance 311 or from the second application instance 312. In in alternative embodiment, the step of reporting 47 the new assignment may take place before the user starts to use 46-1 the new application instance 312.

In step 48, the management entity 300 creates or updates a mapping between users or UEs and application instances, to identify the assignment of application instance 312 to the user of UE 303-1. This step may include storing the mapping in memory storage 304.

In step 49, the management entity 300 may track and estimate user mobility and decides new scaling based thereon, now having access to reliable mapping information between users and application instances.

Various embodiments have been disclosed in the foregoing, related to the proposed concept of management of edge computing servers. Unless clearly contradictory, such embodiments may be combined in any way. For the implementation of the presented solutions on MEC as proposed by ETSI, it may be noted that the EC architecture fundamentals, as indicated in FIG. 1, are based on a management entity 300, including at least the MEC orchestrator 101, that is responsible for resources, scaling and selecting the EC server for hosting the application instance. The MEC application 228 is totally independent of the management entity's decisions and is only responsible for the logic of how to manage and distribute users among EC application instances. This means that the EC application 228 has all logic on which users belong to the same group, for example in a video conference system, but the management entity 300 decides how scaling of EC servers and assigning of users should be done regardless of the EC application 228. Therefore, it is proposed herein that the EC management entity 300 is provided with knowledge about EC application users in the EC system to be able to track the individual users and estimate proactively how to scale depending on expected user mobility. This requires the mapping of the users and application instances in the EC system to always be updated by the EC application instances. Obtainment of application-controlled user assignment to application instances, in the management entity 300, may e.g. involve use of the Mp1 and Mm3 interface in the ETSI MEC reference architecture defined in GS MEC003, corresponding to FIG. 1.

The invention claimed is:

1. A method for managing resource allocation in an Edge Computing, EC, system, carried out in an EC management entity connected to at least one EC host, comprising
detecting a request from a user equipment, UE, which request is associated with an EC application;
providing at least one application instance of said EC application in a host of the EC system;
receiving user assignment information from the EC application; and
determining a mapping between the UE and a specific application instance based on the received user assignment information.

2. The method of claim 1, wherein said user assignment information identifies the specific application instance assigned to said UE.

3. The method of claim 2, wherein providing at least one application instance includes selecting a mapping between the UE and a first application instance to assign a user of the UE to the first application instance.

4. The method of claim 3, wherein providing at least one application instance includes directing the UE to the first application instance.

5. The method of claim 1, wherein said user assignment information identifies a redistribution of application user identities between two or more different application instances within the EC system, determined by the application.

6. The method of claim 3, wherein determining a mapping includes updating the selected mapping for the UE to the said specific application, responsive to the specific application instance being different from the first application instance.

7. The method of claim 1, wherein providing at least one application instance includes selecting a currently operative application instance.

8. The method of claim 1, wherein providing at least one application instance includes starting a new application instance.

9. The method of claim 1, comprising storing the mapping in a memory storage.

10. The method of claim 1, wherein detecting a request from the UE includes detecting initiation of the application from the UE.

11. The method of claim 1, wherein detecting a request from the UE includes detecting connection to the EC system of the UE, when the UE is running the EC application.

12. The method of claim 1, comprising
determining to scale resources in the EC system responsive to detecting the request from the UE.

13. The method of claim 1, comprising
determining allocation of resources to the specific application instance based on the mapping.

14. The method of claim 1, comprising
providing said at least one application instance with information about other application instances of the same application.

* * * * *